United States Patent
Afzal et al.

(10) Patent No.: US 7,149,231 B2
(45) Date of Patent: Dec. 12, 2006

(54) MONOLITHIC, SIDE-PUMPED, PASSIVELY Q-SWITCHED SOLID-STATE LASER

(75) Inventors: Robert S. Afzal, Providence, RI (US); Andrei Smuk, Providence, RI (US)

(73) Assignee: Spectra Systems Corporation, Providence, RI (US)

(*) Notice: Subject to any disclaimer, the term of this patent is extended or adjusted under 35 U.S.C. 154(b) by 32 days.

(21) Appl. No.: 10/678,694

(22) Filed: Oct. 3, 2003

(65) Prior Publication Data
US 2004/0066805 A1 Apr. 8, 2004

Related U.S. Application Data

(60) Provisional application No. 60/416,025, filed on Oct. 4, 2002.

(51) Int. Cl.
*H01S 3/11* (2006.01)
*H01S 3/113* (2006.01)

(52) U.S. Cl. .............. 372/10; 372/11; 372/33

(58) Field of Classification Search .......... 372/10, 372/11, 70, 66, 33
See application file for complete search history.

(56) References Cited

U.S. PATENT DOCUMENTS

| | | | | |
|---|---|---|---|---|
| 3,680,000 A | * | 7/1972 | Chesler et al. | 372/99 |
| 5,381,431 A | | 1/1995 | Zayhowski | 372/25 |
| 5,394,413 A | | 2/1995 | Zayhowski | 372/10 |
| 5,414,724 A | | 5/1995 | Zhou et al. | 372/10 |
| 5,432,811 A | * | 7/1995 | Polushkin et al. | 372/66 |
| 5,463,649 A | * | 10/1995 | Ashby et al. | 372/40 |
| 5,485,482 A | | 1/1996 | Selker et al. | 372/75 |
| 5,495,494 A | | 2/1996 | Molva et al. | 372/98 |
| 5,651,023 A | | 7/1997 | MacKinnon | 372/107 |
| 5,847,871 A | * | 12/1998 | Sumida et al. | 359/487 |
| 6,115,400 A | * | 9/2000 | Brown | 372/93 |
| 6,219,361 B1 | | 4/2001 | Guch, Jr. et al. | 372/10 |
| 6,282,223 B1 | * | 8/2001 | Angeley | 372/92 |
| 6,373,864 B1 | | 4/2002 | Georges et al. | 372/10 |
| 6,377,593 B1 | | 4/2002 | Peterson et al. | 372/11 |
| 6,788,723 B1 | * | 9/2004 | Langhans et al. | 372/66 |
| 2002/0122455 A1 | * | 9/2002 | Knights et al. | 372/108 |

OTHER PUBLICATIONS

S. Zhou, K. Lee, Y. Chen and S. Li, "Monolithic self-Q-switched Cr,Nd:YAG laser"; Apr. 1, 1993/vol. 18, No. 7/Optics Letters, pp. 511-512.

J.J. Zayhowski and C. Dill III, "Diode-pumped passively Q-switched picosecond microchip lasers"; Sep. 15, 1994/vol. 19, No. 18/ Optics Letters, pp. 1427-1429.

(Continued)

*Primary Examiner*—James Menefee
(74) *Attorney, Agent, or Firm*—Harrington & Smith, LLP (57) ABSTRACT

A monolithic, side pumped, passively Q-switched, solid-state laser (10) includes a laser resonator structure (16) that includes a laser gain medium (12) having an output face bonded to a passive Q-switch (14). The gain medium (12) has a side face (12A) for receiving pump light. The pump light is preferably generated by a laser diode array (20). In a further embodiment, a non-linear optical material (22), such as frequency doubling KTP, is optically coupled to an output face of the Q-switch for providing output wavelength conversion. A method is also disclosed for fabricating the monolithic, side pumped, passively Q-switched, solid-state laser. Techniques are included for providing compensation from thermal aberrations during operation of the laser.

29 Claims, 6 Drawing Sheets

OTHER PUBLICATIONS

R. Afzal, A. Yu, J. Zayhowski and T. Fan, "Single-mode high-peak-power passively Q-switched diode-pumped Nd:YAG laser"; Sep. 1, 1997/vol. 22, No. 17, Optics Letters, pp. 1314-1316.

J. Nettleton, B. Schilling, D. Barr and J. Lei, "Monoblock laser for a low-cost, eyesafe, microlaser range finder"; May 20, 2000/vol. 39, No. 15/ Applied Optics, pp. 2428-2432.

* cited by examiner

MONOLITHIC, SIDE-PUMPED, PASSIVELY Q-SWITCHED SOLID-STATE LASER

CROSS REFERENCE TO RELATED APPLICATION

This patent application claims priority under 35 U.S.C. §119(e) to U.S. Provisional Patent Application No. 60/416, 025, filed Oct. 4, 2002. The disclosure of this application is incorporated by reference herein in its entirety.

TECHNICAL FIELD

These teachings relate generally to lasers and, more specifically, to solid state laser devices, including side-pumped laser devices, and to methods for manufacturing same.

BACKGROUND

Diode pumped lasers have grown in usefulness, particularly in industrial, medical and military applications. Diode pumped lasers are particularly useful in that diode pumps are power efficient, all solid-state and long lived. This results in laser systems that are lighter, more efficient and typically not water cooled, as compared to similar flashlamp pumped solid-state lasers.

Figure 1:
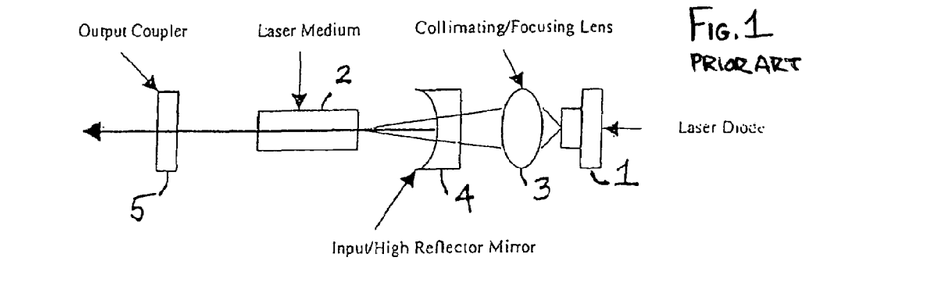
FIG. 1 illustrates a conventional laser that is end pumped with a diode laser.
Figure 2:
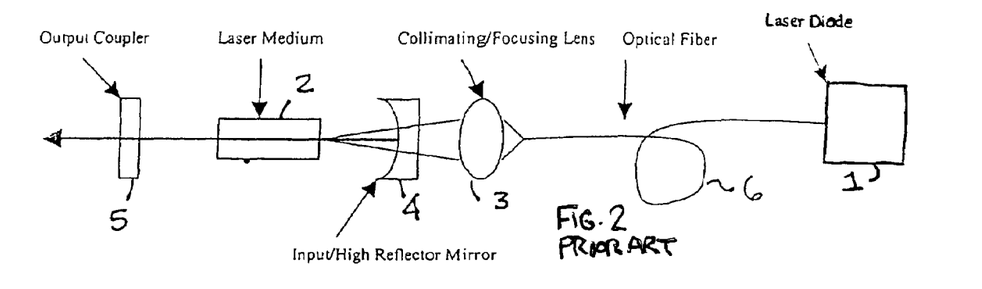
FIG. 2 illustrates a conventional laser that is end pumped with a diode laser via an optical fiber.

As is shown in FIG. 1, most conventional diode-pumped lasers use an "end-pumped" configuration where the laser diode 1 pump light is introduced into the lasing medium 2, via collimating/focusing optics 3, along the lasing axis. The laser medium 2 is contained within a resonant cavity structure defined by an input/high reflector mirror 4 and an output coupler 5. This configuration is useful for generating efficient lasing with excellent beam quality. Diode end pumped lasers also typically use only one diode pump source and, owing to the fact the diode lasers are usually the most expensive component, this configuration maximizes the use of available pump light. Diode pumps that are used for end pumping are usually either directly collimated and focused into the gain medium 2, as shown in FIG. 1, or the pump light is introduced from the end of an optical fiber 6, as shown in FIG. 2. Arrays or single emitters, used in this fashion, have sufficient brightness or beam quality to enable efficient end-pumping.

An example of an end pumped microlaser is provided in U.S. Pat. No. 5,394,413 "Passively Q-Switched Picosecond Microlaser" issued Feb. 28, 1995 to Zayhowski. This patent discloses a microlaser for producing high-peak-power pulses of light of short duration. The short duration is achieved by controlling factors such as the length of the cavity. Accordingly, the microlaser is not scaleable, by design. As with some other lasers, the microlaser makes use of diodes for pumping.

Figure 3:
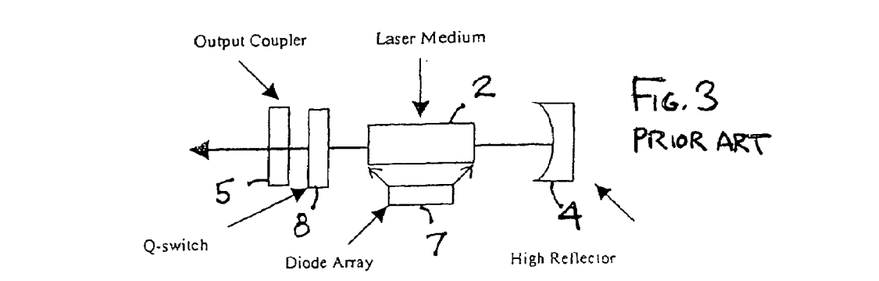
FIG. 3 illustrates a conventional Q-switched laser that is side pumped with a diode laser array.

Diode arrays used for end pumping are typically not the highest power devices, having peak powers ranging from a few watts. Some may be fiber coupled to achieve powers up to 40 watts. The highest power devices, known as quasi-cw diode bars, with peak powers up to 100 W per device, can also be configured into stacked arrays 7 which are capable of up to kW of peak power. These devices are used in a pulsed configuration, and due to reduced brightness, are coupled into the lasing medium transverse to the laser mode, or in a so-called side-pumping configuration as shown in FIG. 3.

Using high-power, quasi-cw diode arrays 7 in the side pumping configuration is typically most useful for generating high peak-power pulses in the pulse energy regime of millijoules to Joules. Diode side-pumped lasers are usually Q-switched either electro-optically or passively using a saturable absorber as a Q-switch 8. There are many side pumped, Q-switched laser embodiments published in the literature, with many of the proposed architectures emphasizing performance. In diode side-pumped geometries, the gain media is typically either a rod or a slab. Slab geometries have typically been used in conductively cooled laser systems with one side of the slab attached to a thermal heat sink, and with the opposing face used for the introduction of pump light. This asymmetric pumping geometry inevitably leads to uncompensated thermal gradients which result in lensing, stress induced birefringence and other optical aberrations. Side pumped slabs can employ various techniques such as utilizing a so called "zig-zag" optical path. Zig-zag slabs, however, are difficult to fabricate owing to tight optical tolerances and are therefore more difficult to produce in large quantities than straight through slab embodiments, and are therefore more expensive to produce.

One example of a laser using a zig-zag optical path is disclosed in U.S. Pat. No. 6,377,593 "Side Pumped Q-Switched Microlaser and Associated Fabrication Method" issued Apr. 23, 2002 to Peterson et al. This patent discloses Q-switched microlaser that uses a zig-zag resonation pattern with side pumping of the active gain medium so as to effectively lengthen the microresonator cavity without physically lengthening the microresonator cavity. In addition to imposing certain requirements upon the orientation of the end faces, this patent teaches use of both reflectance and anti-reflection coatings upon the sides of the microresonator, such techniques being more costly to manufacture and control.

Another design is presented in the publication "Monolithic Self-Q-Switched Cr,Nd:YAG Laser", S. Zhou et al., Optics Letters, Vol. 18, No. 7, pgs. 511–512, Apr. 1, 1993. This publication describes a monolithic laser that end pumps a codoped Cr,Nd:YAG crystal with the focused output of a diode laser. Zhou et al. later obtained a patent for a "Monolithic Self Q-Switched Laser" on May 9, 1995 (U.S. Pat. No. 5,414,724). This patent discloses a laser that includes a length of solid-state laser material with a plurality of dopants (co-doping), so that the material can generate coherent radiation for laser action and, in the same material, provide saturable absorption at the wavelength of the laser emission necessary for Q-switching. This laser suffers from certain drawbacks. For example, manufacturing the laser material requires careful control of the amount of co-doping to ensure proper growth of the crystal. Failure to ensure proper controls can lead to rejection of the microlaser during manufacturing. Further, as the saturable absorber material is present at the entrance of the pump light, it is available to interfere with the pump light, and therefore cause performance issues.

"Diode-Pumped Passively Q-Switched Picosecond Microchip Lasers", J. J. Zayhowski et al., Optics Letters, Vol. 19, No. 18, pgs. 1427–1429, Sep. 15, 1994, describes an end pumped laser where the gain medium was a 0.5 mm long piece of $Nd^{3+}$:YAG crystal, where the saturable absorber (Q-switch) was a 0.25 mm long piece of $Cr^{4+}$:YAG, and where the output of a pump diode was coupled to the end of the gain medium through 100 micron core optical fiber.

"Single-Mode High-Peak-Power Passively Q-Switched Diode-Pumped Nd:YAG Laser", R. S. Afzal et al., Optics Letters, Vol. 22, No. 17, pgs. 1314–1316, Sep. 1, 1997, describes linear and ring-cavity laser configurations where a Nd:YAG seven bounce slab is side pumped using a close coupled 1 cm long 100 W quasi-cw diode pump array within, for the linear embodiment, a 5 cm long resonator structure bounded by a flat output coupler and a 2.5 m radius of curvature high reflector.

"Monoblock Laser For A Low-Cost, Eyesafe, Microlaser Range Finder", J. E. Nettleton et al., Applied Optics, Vol. 39, No. 15, pgs. 2428–2432, May 20, 2000, describes a flash-lamp-pumped $Nd^{3+}$:YAG crystal with a $Cr^{4+}$:YAG passive Q-switch and an intracavity potassium titanyl arsenide (KTA) optical parametric oscillator (OPO) used for frequency conversion from 1.06 microns to 1.54 microns. A feature of this design is that the 1.54 micron laser cavity consists of four rectangularly shaped crystals: the Nd:YAG laser rod (25 mm long); a Nd:YAG endcap (10 mm long), where the laser rod and endcap have complementary end faces cut at the Brewster angle; the $Cr^{4+}$:YAG passive Q-switch (3 mm long); and the KTA OPO. These four components were arranged on and bonded to a ceramic laser pallet, but not to one another, and in combination with a commercially available instant camera flashtube, formed a monoblock laser transmitter for a range finder.

Reference with regard to an example of a diode-side-pumped laser may be had to U.S. Pat. No. 5,485,482, "Method for Design and Construction Of Efficient, Fundamental Transverse Mode Selected, Diode Pumped, Solid State Lasers", issued Jan. 16, 1996 to M. D.

Selker and R. S. Afzal.

In general, Q-switched micro-lasers or monolithic lasers are end-pumped, such as those described in U.S. Pat. Nos. 5,394,413, 5,381,431, 5,495,494, 5,651,023, and 6,373,864 B1. U.S. Pat. Nos. 6,219,361 B1 and 6,377,593 B1 describe side pumped designs, where the beam path takes an internal zig-zag path, such designs lengthening the optical pulse and increases manufacturing difficulty and cost.

What is needed is a scaleable microlaser that is low cost and simple to manufacture. Preferably, the laser should incorporate techniques for ensuring reliable and high performance operation during thermal loading.

SUMMARY OF THE PREFERRED EMBODIMENTS

The foregoing and other problems are overcome, and other advantages are realized, in accordance with the presently preferred embodiments of these teachings.

A monolithic, side pumped, passively Q-switched, solid-state laser includes a laser resonator structure that contains a laser gain medium having an output face optically contacting a passive Q-switch. The gain medium has a side face for receiving pump light. The pump light is preferably generated by a laser diode array. In a further embodiment a non-linear optical material, such as frequency doubling KTP, can be optically coupled to an output face of the Q-switch for providing output wavelength conversion. The laser may include features to compensate for thermal aberrations arising during operation.

A method is also disclosed for fabricating a monolithic, side pumped, passively Q-switched, solid-state laser. The method includes (a) placing a face of a structure formed of an optical gain material into optical contact with a face of a structure formed of a saturable absorber material to form a composite structure; (b) cutting the composite structure into a plurality of sub-structures each comprising a length of the optical gain material that is to function as a laser gain medium and that is in optical contact with a length of the saturable absorber material that is to function as a passive Q-switch; and (c) blocking up a plurality of the sub-structures and simultaneously polishing an anti-reflection coating on a side surface of each of the sub-structures that is to function as a pump radiation receiving surface. A further step optically couples the pump radiation receiving surface of a sub-structure to a laser diode array.

The step of placing, which may be accomplished by a diffusion bonding process, may further include polishing and coating end faces of the composite structure such that the end face located in the optical gain material is made a high reflector at a wavelength of interest (e.g., 1.064 microns), and such that the end face located in the saturable absorber material is made a partial reflector at the wavelength of interest. Contact bonding or other techniques may also be employed. The steps of cutting or placing may further involve the incorporation of one or more features to provide compensation from thermal aberrations arising during operation of the laser.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 4:
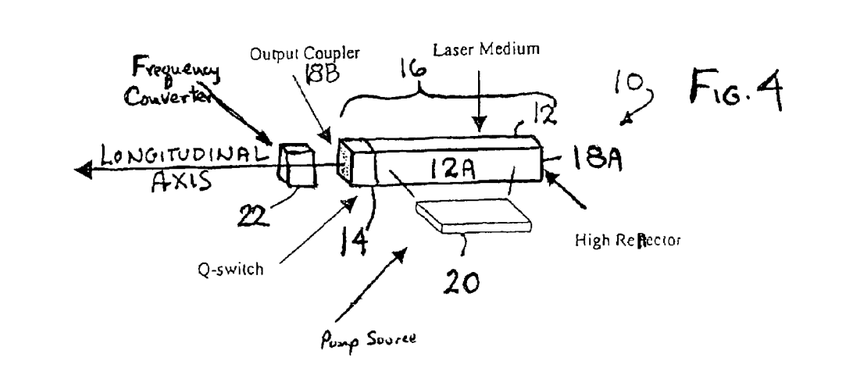
FIG. 4 is a diagram of a monolithic, diode-side pumped, passively Q-switched solid state laser in accordance with an embodiment of this invention.

FIG. 4 illustrates a monolithic, side pumped, passively Q-switched, solid-state laser 10 in accordance with an embodiment of this invention. The laser 10, while maintaining high performance, emphasizes cost reductions by using few parts and by configuring the laser 10 to enable manufacturing in large quantities and reduced cost. The basic laser architecture is intentionally made simple. The laser 10 includes a laser gain medium 12, such as Nd:YAG, which is bonded, either with an optical adhesive or through some other suitable bonding method, such as direct optical contact, to a passive Q-switch 14. The passive Q-switch is made of a saturable absorber material, such as Cr:YAG. This forms a monolithic block structure. The laser resonator 16 is formed by the end faces of the monolithic block structure, with the laser high reflector 18A deposited directly on the gain medium 12 and the output coupler 18B deposited directly on the Q-switch 14. The gain medium 12 is preferably side pumped on a pump face 12A by a pump source 20. Preferably, the pump source 20 is a laser diode array, however, other apparatus such as a flashlamp may be used.

This invention is not limited to Nd:YAG as an optical gain material, but different materials may be used, such as Nd:YVO$_4$, Er:YAG, Er:Glass, Ho:YAG, Tm:YAG, and many others, along with other appropriate Q-switch materials.

The optical path of the laser resonator 16 does not intersect side walls of the gain medium 12, and therefore the sidewalls do not need to be high polished. In fact, the side surfaces of the laser 10, except for the pump face 12A, may have a ground-glass finish and may be potted into a heat-sink (not shown) that is also capable as serving as a diffuse reflector for unabsorbed pump light.

The laser 10 has nearly the theoretical minimum in parts, and is inherently robust, mechanically, electrically and optically.

In an exemplary embodiment, the total length of the laser resonator 16 is about 1.7 cm, and the laser gain medium 12 has a length of about 1.5 cm. A suitable pump repetition frequency is about 40 Hz, considered for this invention to provide quasi-CW pumping, and each pump pulse may have a pulse width of about 200 microseconds. The output of the laser 10 may be pulses of about 5 mJ, each having a pulse width of less than about 3 nanoseconds, depending on the passive Q-switch 14 leading to peak powers exceeding 1 MW. The output pulses could be polarized or non-polarized. It is also within the scope of this invention to optionally employ a non-linear optical material 22 such as, but not limited to, a frequency doubling crystal of KTP, a Raman crystal such as Barium Nitrate, or an optical parametric oscillator (OPO) made from KTA. The non-linear material 22 could be located intra-cavity or external to the resonant cavity (as shown in FIG. 4). In the former case the output coupler face 18B may be formed on an output face of the non-linear optical material 22.

Figure 5A:
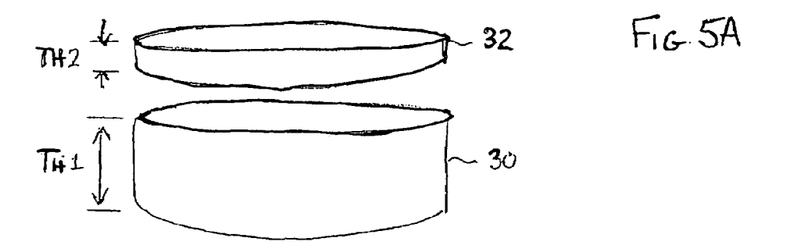
FIGS. 5A–5D illustrate an embodiment of process steps undertaken during the fabrication of the monolithic solid state laser shown in FIG. 4.

FIGS. 5A–5D illustrate process steps during the fabrication of an embodiment of the laser 10 of FIG. 4. In FIG. 5A, two structures are provided. A first structure 30 is obtained from a boule of Nd$^{3+}$:YAG crystal and has a thickness (TH1) in the range of, by example and not byway of limitation, about 1 cm to about 1.5 cm. A second structure 32 is obtained from a boule of Cr$^{4+}$:YAG and has a thickness (TH2) in the range of, by example and not by way of limitation, about 0.1 cm to about 0.25 cm.

Figure 5B:
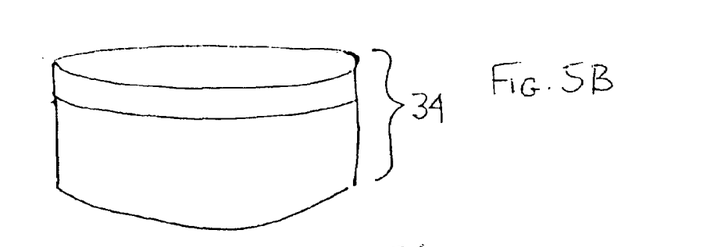

In FIG. 5B, the first and second structures 30, 32 are placed in optical contact along polished faces thereof to form a composite structure 34. The placing operation can be accomplished by a diffusion bonding process. Reference in this regard can be made, as examples, to U.S. Pat. No.: 5,441,803, "Composites made from single crystal substances", H.E. Meissner; U.S. Pat. No.: 5,846,638, "Composite optical and electro-optical devices", H.E. Meissner; and U.S. Pat. No.: 5,852,622, "Solid state lasers with composite crystal or glass components", H.E. Meissner et al., or U.S. Pat. No.: 6,548,176, "Hydroxide-Catalyzed Bonding", D. Gwo.

As used herein "optically contacting" is taken to mean any technique for placing the gain medium 12 in a relation to the saturable absorber 14 such that there is substantial continuity of optical signals. Therefore, physical contact may not be required to achieve optical contact.

Alternatively, an optical cement or epoxy may be used to bond the first and second structures together, or the two surfaces may be joined by other techniques. In a still further embodiment, the process steps shown in FIGS. 5A and 5B may be replaced by instead providing a monolithic structure 34 that is co-doped with both Nd and Cr ions, as is known in the art.

As a further alternative, forming the monolithic laser resonator structure starts with the optical gain material (e.g., Nd:YAG), and subsequent deposition of the saturable absorber material (e.g., Cr:YAG) onto the optical gain material using liquid phase epitaxy. Further embodiments include the use of intermediate spacing materials, such as for example, undoped YAG.

The polishing and coating of the end surfaces with high reflectance and partial reflectance coatings can occur at this point.

Figure 5C:
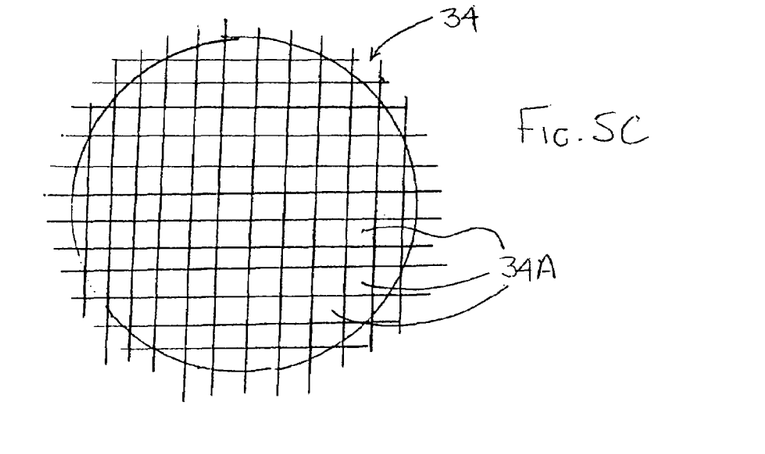

FIG. 5C is a top view of the monolithic structure 34 of FIG. 5B, and shows the placement of saw or scribe lines for dividing the structure into a plurality of sub-structures 34A. Each of the sub-structures 34A may have end dimensions in the range of, as an example and not by way of limitation, about 1 mm to about 2.5 mm.

Figure 5D:
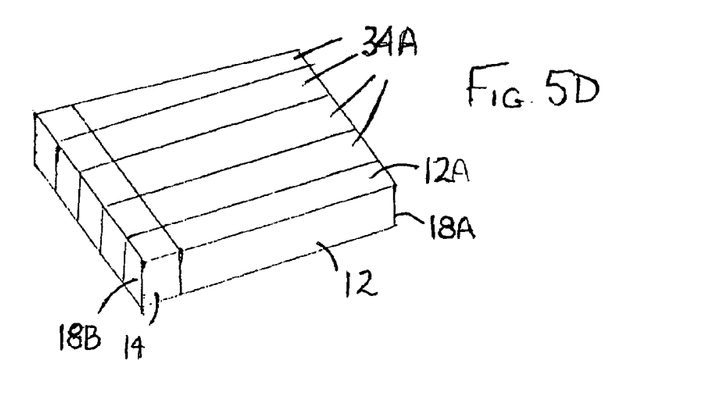

FIG. 5D shows some number, for example five, of the sub-structures 34 that are "blocked up" together for performing in parallel end polishing and end coating steps, if not already performed at the stage depicted in FIG. 5B. As examples, the ends 18A are made highly reflective at 1.064 microns, while the ends 18B are made partially reflective at 1.064 microns. It is also preferred at this time to polish the pump side 12A of the structures 34A, and to also deposit an anti-reflection (AR) coating. As an example, the AR coating is effective at a pump wavelength of 0.808 microns and can comprise a coating of MgF or it can comprise known types of oxide coatings. Multi-layered interference stack-type coatings can also be employed. Suitable deposition processes include, but need not be limited to, e-beam deposition and sputtering. The sub-structures 34A can then be separated and used for final construction of a plurality of the lasers 10.

In the final construction the sub-structures 34A are optically coupled to the pump diode array. An example of a pump diode array suited for use as a pump source 20 is one available from Coherent Corporation of Santa Clara, Calif., and known as a G package QCW stacked array. The spacing between the pump surface 12A and the diode array may be, as an example, in the range of about 0.1 mm to about 0.5 mm. The actual area of the surface 12A that receives the pump light may have dimensions of about 0.5 mm by about 10 mm (i.e., it may not be necessary to polish and AR coat the entire area of the pump surface 12A). The laser assembly can be potted, such as by placing it into an aluminum block having a recess for receiving the assembly, and then potting the assembly within the recess using a suitable thermally conductive potting compound. When potted, at least the side face 12A that is pumped and the output face 18B are exposed.

It can be noted that the laser 10 shown in FIG. 4 is considerably larger than a typical microchip laser which is typically on the order of about one millimeter in length, and which typically emits microjoule pulses having less than 1 ns pulsewidth, with peak powers in the range of 10's of kW. The laser 10 is also designed to be side-pumped, not end-pumped as is the typical microchip laser. One benefit of the larger size and the use of side pumping is that a higher pump power can be used, resulting in higher laser output power and greater pulse energies. Furthermore, the larger size means that the laser 10 can typically support more than one transverse or longitudinal mode, (i.e., the laser 10 may exhibit multi-mode operation), as opposed to the typical single mode operation of the significantly smaller microchip laser.

The architecture of the laser 10 depicted in FIG. 4 differs from the above-noted monoblock laser design. For example, in the illustrated embodiment the laser gain medium 12 is preferably bonded to the passive Q-switch 14, and furthermore the laser 10 does not require a specialized alignment component, such as the ceramic laser pallet described in the above-referenced publication, entitled "Monoblock Laser for a Low-Cost, Eyesafe, Microlaser Range Finder", J. E. Nettleton et al., Applied Optics, Vol. 39, No. 15, pgs. 2428–2432, May 20, 2000, as well as U.S. Pat. Nos. 6,373,865 and 6,556,614.

The laser architecture depicted in FIG. 4 provides for simplicity of construction and operation. For example, the design depicted does not follow a zig-zag path, which simplifies manufacturing and therefore reduces cost. As the sidewalls do not need to be high polished, and may have a ground-glass finish, fewer steps are taken to produce the laser 10. Inherently, fewer parameters are evaluated to accept or reject the laser 10 during manufacturing.

The laser 10 may be further adapted to account for thermal aberrations. Encountering thermal issues during operation is known. Prior art systems have attempted to lessen thermal effects by the incorporation of a heat sink, as discussed elsewhere herein. While use of a heat sink may conduct thermal energy away from portions of laser, such systems do not account for the thermal gradient in the laser. The uneven expansion that results during operation also affects the index of refraction, and therefore the operation of the laser.

Figure 6:
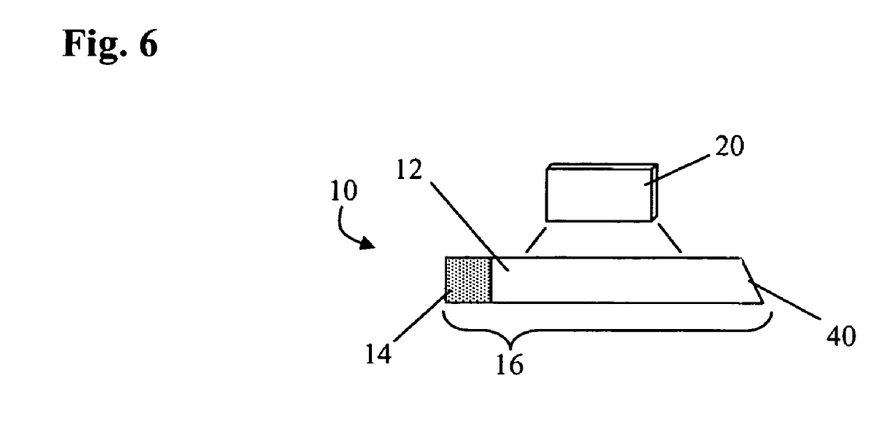
FIG. 6 depicts aspects of a monolithic laser with an end face tilt added for thermal aberration compensation.
Figure 7:
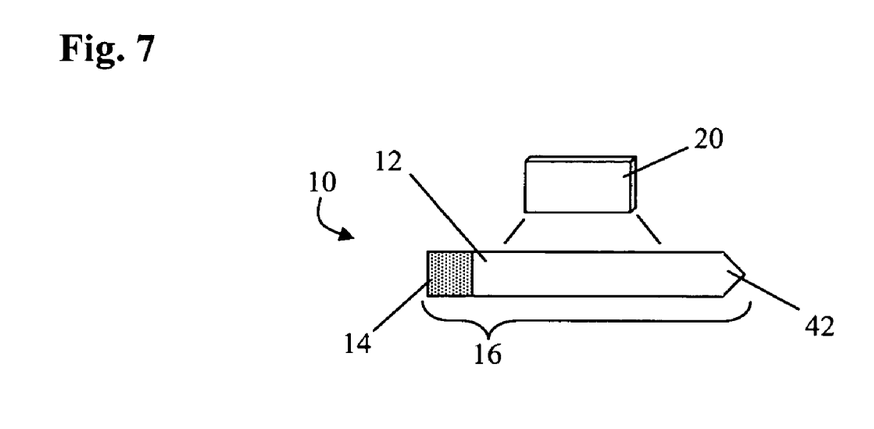
FIG. 7 depicts a monolithic laser with and face Porro prism high reflector for thermal compensation.

Thermal induced aberration compensation may be achieved in different ways to achieve high performance operation. Since the predominant aberration induced by a unidirectional thermal gradient is a simple tilt to the wave front, tilt compensation may be used to reduce the aberration. This can be achieved by adding a small opposite or compensating tilt to either one or both of the end faces. Preferably, the degree of tilt compensates for the thermally induced phase front tilt induced at the desired operational power level. A typical tilt angle may be about 180 uradians. Another technique for thermal aberration compensation is to fabricate a 90 degree Porro prism directly onto the end face of the monolithic laser 10. In this embodiment, the Porro prism replaces the high reflecting coating, and provides for inversion of the laser mode upon reflection. This provides for symmetry across the phase front, as the effects resulting from thermal gradients are evenly factored upon each roundtrip of the phase front through the resonator. One example of tilt compensation is depicted in FIG. 6. In FIG. 6, a single tilted end face 40 is depicted. FIG. 7 depicts one example of a Porro prism 42 incorporated into the laser 10.

It is recognized that thermal aberration compensation techniques, such as the foregoing, may be advantageously used in other embodiments of lasers, including those that are end-pumped. In this regard, it is considered that the techniques of thermal aberration compensation may be used with other features of a monolithic (or other) laser. For example, side walls, or other reflective surfaces, may incorporate tilt compensation. The design of compensation features preferably takes into account the operational requirements for the laser 10. For example, where continued operation will be required, a greater tilt may be incorporated into the laser 10, then if the laser 10 were only to be used for short bursts. Thermal aberration compensation may be used in monolithic lasers having a gain medium 12 separate from the saturable absorption medium 14. Likewise, such features may be incorporated into co-doped lasers, where the gain medium and the saturable absorption medium are commingled.

The design of the laser 10 is inherently very versatile. If desired, the gain medium 12 may be sized to support only the lowest order transverse mode, or it may be increased in size in order to accept a large diode pump array to generate higher power. Under single transverse mode operation, the laser 10 may operate on a single longitudinal mode as well, and since the laser 10 is monolithic, it may be temperature controlled to provide wavelength tuning. This architecture is scaleable and the size can be varied to accommodate a single laser diode pump to multiple stacks of high power devices. The laser pulse energy may range from microjoules to Joules of energy.

Exemplary Embodiment

Figure 8:
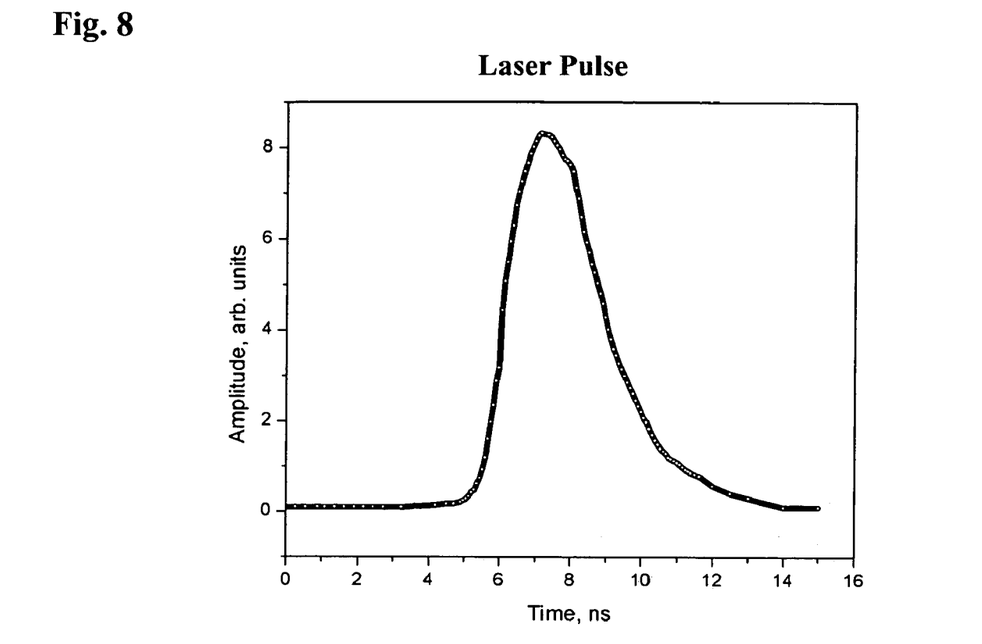
FIG. 8 depicts a laser pulse of 3 ns.
Figure 9:
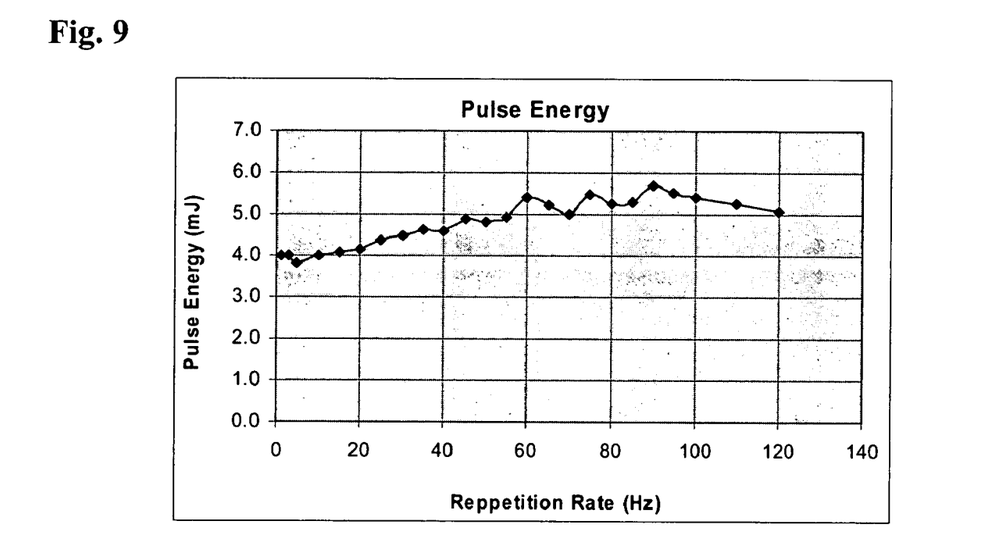
FIG. 9 depicts pulse energy as a function of repetition rate.
Figure 10:
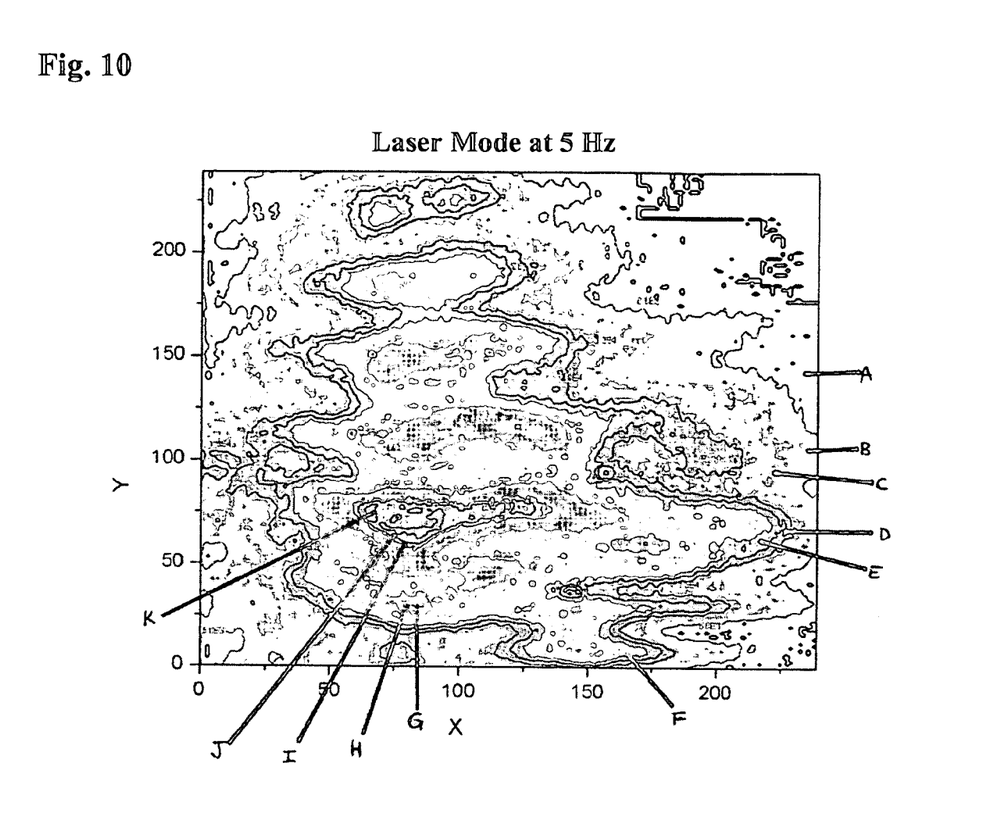
FIG. 10 depicts the laser mode at 5 Hz.
Figure 11:
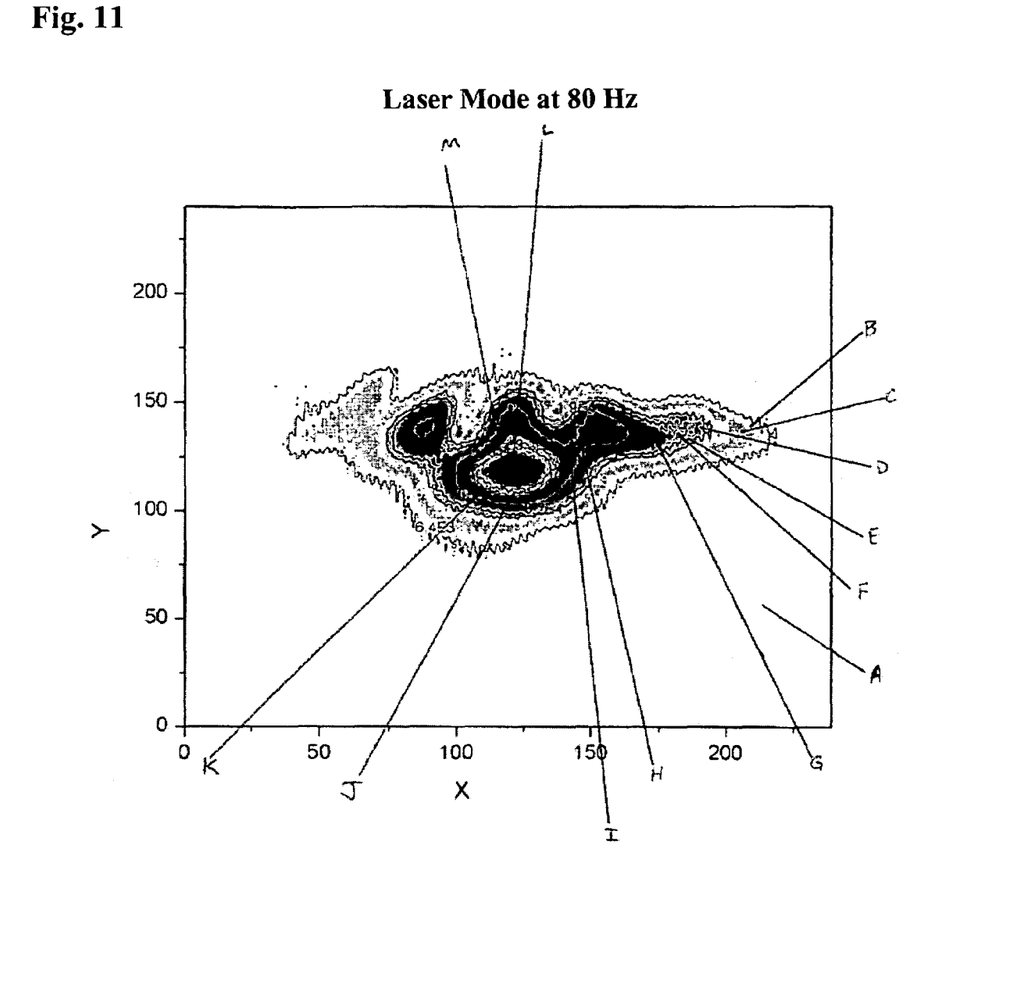
FIG. 11 depicts the laser mode at 80 Hz.

The performance of a preferred embodiment of the monolithic passively Q-switched solid-state laser 10 was evaluated. In the embodiment tested, the laser 10 was 1.7 cm long and had a cross section of 1.6 mm×1.6 mm. The gain media 12 was 1.5 cm long and included 1% doped $Nd^{3+}$:YAG with a 0.2 cm passive Q-switch 14 of $Cr^{4+}$:YAG bonded to the gain medium 12. The saturable absorber material 14 had an optical density of 0.4. One end-face 18A was coated with a dielectric mirror of R=99.7% at 1064 nm and the other end-face 18B was coated with a partial reflector of R=60% at 1064 nm. The end faces 18A, 18B were tilted away off parallelism by 180 grad to compensate for thermal distortion from one-side pumping. The laser 10 was side pumped with a pump source 20 that was a quasi-cw diode stacked array capable of 300 W peak power and pumped for 200 µsec. The laser 10 emitted 3 ns pulses of 5 mJ. A pulse signal is depicted in FIG. 8. The laser 10 was operated from 1 Hz to 120 Hz repetition rate, as shown in FIG. 9. In this embodiment, the maximum pulse energy was achieved at about 90 Hz. It is considered this was achieved at least partially as a result of the tilt incorporated into the end reflectors for thermal aberration compensation. This effect can also be seen in the laser mode profiles. At low repetition rate and low thermal loading the laser mode is distorted as a result of the imparted misalignment of the end-faces. This is shown in FIG. 10. At high repetition rate and higher thermal load, the imparted tilt compensates for the induced thermal gradient. This is shown in FIG. 11. In FIGS. 10–11, the laser mode is depicted wherein the signal intensity is graded from the weakest A (no signal) to the most intense K (FIG. 10) or M (FIG. 11). As one can clearly see, the mode profile is closest to a lower order transverse mode where tilt compensation provides correction for thermal aberrations. As shown in FIG. 11, not only is the mode of a lower order, a more intense laser mode M results.

In a further embodiment, a nonlinear optical material referred to as KTP was used to generate second harmonic light at 532 nm. In this embodiment, a 2.4 mJ of 532 nm was generated, with a coincident 47% conversion efficiency from 1064 nm.

The laser 10 architecture has the following exemplary advantages over the prior art. The laser 10 is inherently simple and therefore simplifies manufacturing and operation. There is no inherent size restriction and, in principle, the laser 10 can be made in a variety of sizes. The length of the laser resonator 12 can be made short for generating shorter, higher peak power laser pulses that are useful for precision timing and nonlinear optical light generation, such as harmonic generation, Raman shifting or optical parametric conversion. The resonator 12 length may be increased to increase the emission pulsewidth.

Note that in the illustrated embodiments, and as was mentioned above, direct optical contact may be used in lieu of the diffusion bonding of surfaces or the use of optical cement. The use of optical contact implies that the surfaces to be contacted are highly polished and smooth. After being contacted, the surfaces thereafter remain in contact due to surface interaction effects at the molecular level. The above-described potting process can be employed to enhance the robustness of the optical contact bond.

What is claimed is:

1. A solid-state laser comprising a freestanding laser resonator composite structure comprised of a laser gain medium optically contacting a passive Q-switch, wherein the composite structure comprises end faces forming a linear optical path resonant cavity therebetween, the end faces comprising at least partially reflecting coatings deposited thereon, the gain medium comprising a side face for receiving pump light.

2. The solid-state laser as in claim 1, further comprising a laser diode array for generating the pump light.

3. The solid-state laser as in claim 1, further comprising a flashlamp for generating the pump light.

4. The solid-state laser as in claim 1, wherein the end faces comprise resonator mirrors and where the at least partially reflecting coatings are deposited on the resonator mirrors.

5. The solid-state laser as in claim 1, further comprising a non-linear optical material optically coupled to the composite structure.

6. The solid-state laser as in claim 5, where an intra-cavity portion of the resonant cavity comprises the non-linear optical material.

7. The solid-state laser as in claim 5, where a portion of the laser external to the resonant cavity comprises the non-linear optical material.

8. The solid-state laser as in claim 5, where the non-liner optical material comprises one of: a frequency doubling crystal, a Raman crystal and an optical parametric oscillator.

9. The solid-state laser as in claim 1, where the laser gain medium comprises one of Nd:YAG, Nd:YVO$_4$, Er:YAG, Er:Glass, Ho:YAG and Tm:YAG.

10. The solid-state laser as in claim 1, where the passive Q-switch comprises Cr:YAG.

11. The solid-state laser as in claim 1, comprising means for thermally induced aberration compensation.

12. The solid-state laser as in claim 11, where the means for compensation comprises a tilt in at least one of the end faces.

13. The solid-state laser as in claim 11, where the means for compensation comprises a Porro prism oriented as to compensate for thermal gradients.

14. The solid state laser as in claim 1, wherein said end faces forming said linear optical path resonant cavity therebetween are each disposed at least substantially parallel at an orthogonal angle about zero degrees relative to a longitudinal axis defined by said linear optical path resonant cavity.

15. The solid-state laser as in claim 1, wherein the composite structure is formed as a monolithic block structure.

16. The solid-state laser as in claim 1, further comprising a bonding material for bonding the laser gain medium and passive Q-switch together.

17. The solid-state laser as in claim 1, where the laser gain medium is crystalline.

18. The solid-state laser as in claim 17, where the laser gain medium comprises one of Nd:YAG, Nd:YVO$_4$, Er:YAG, Ho:YAG and Tm:YAG.

19. The solid state laser as in claim 1, further comprising a block having a recess for receiving the freestanding laser resonator composite structure, wherein the freestanding laser resonator composite structure resides within the recess.

20. A solid-state laser comprising a laser resonator composite structure comprised of a laser gain medium, wherein the composite structure comprises at least two surfaces forming a linear optical path resonant cavity therebetween, and at least one surface of the at least two surfaces is adapted for thermal aberration compensation to compensate for aberration induced by a unidirectional thermal gradient.

21. The solid-state laser of claim 20, where the composite structure comprises a passive Q-switch.

22. The solid-state laser of claim 20, where the at least one surface comprises a tilt.

23. The solid-state laser of claim 22, where the tilt comprises an angle of about 180 μRad.

24. The solid-state laser of claim 20, where the at least one surface comprises a Porro prism oriented as to compensate for thermal gradients.

25. The solid-state laser of claim 20, where the laser comprises a monolithic laser.

26. The solid-state laser of claim 20, where the composite structure is adapted for receiving pump light from at least one of a side and an end.

27. The solid-state laser of claim 20, where the gain medium comprises a saturable absorber material.

28. The solid-state laser of claim 20, further comprising a non-linear optical material optically coupled to the composite structure.

29. The solid state laser of claim 20, wherein said at least two surfaces forming said linear optical path resonant cavity therebetween are each disposed at least substantially parallel at an orthogonal angle about zero degrees relative to a longitudinal axis defined by said linear optical path resonant cavity.

* * * * *